UNITED STATES PATENT OFFICE.

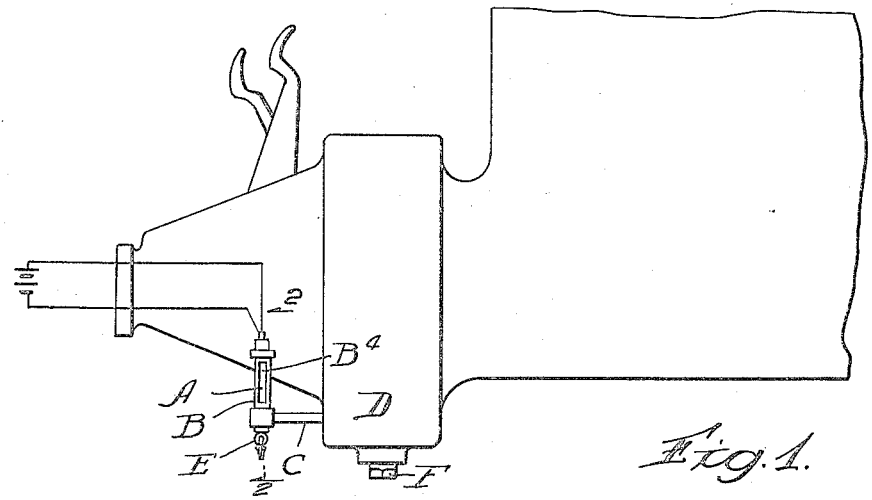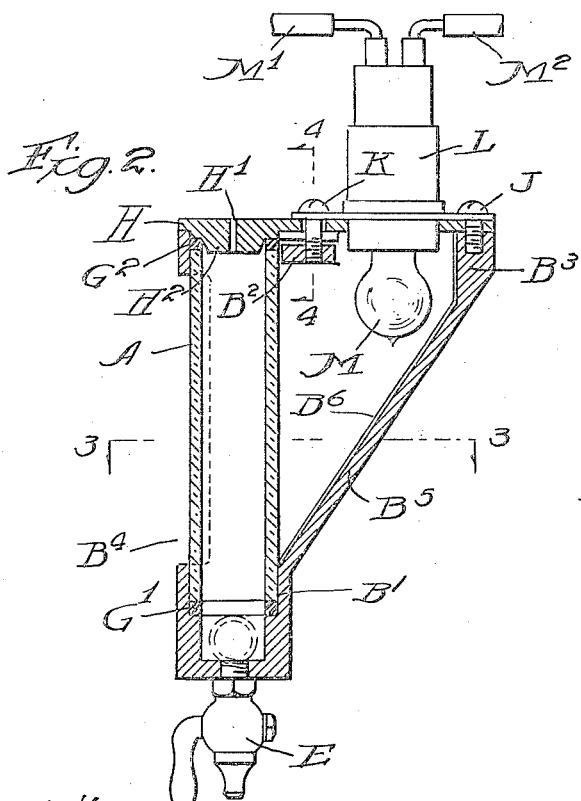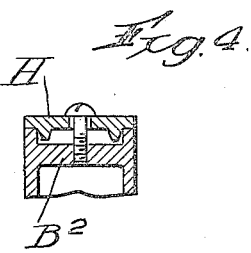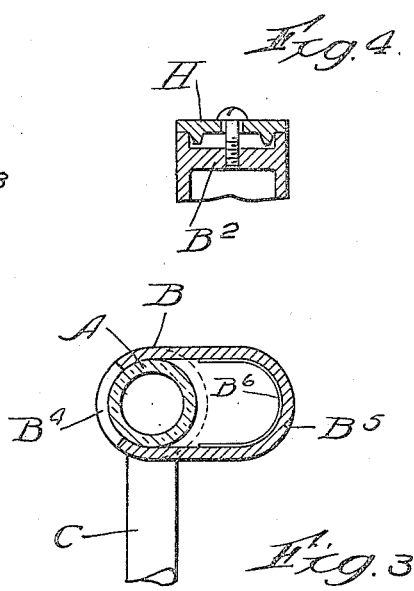

MARTIN L. CRANMER, OF CHICAGO, ILLINOIS.

ILLUMINATED OIL-GAGE.

1,206,815.  Specification of Letters Patent.  Patented Dec. 5, 1916.

Application filed January 6, 1916. Serial No. 70,565.

*To all whom it may concern:*

Be it known that I, MARTIN L. CRANMER, a citizen of the United States, residing at Chicago, in the county of Cook and State of Illinois, have invented new and useful Improvements in Illuminated Oil-Gages, of which the following is a specification, reference being had to the accompanying drawings, forming a part thereof.

This invention relates to means for illuminating a gage glass in a manner to render the contents clearly visible at whatever level it may stand in the glass.

It consists of the features and elements described and shown in the drawings as indicated in the claims.

In the drawings: Figure 1 is a partial outline of an automobile motor illustrating the device which is the subject of this invention applied thereto. Fig. 2 is a vertical medial section of the device taken as indicated at line 2—2 on Fig. 1, and showing its principal features of construction. Fig. 3 is a transverse detail section taken at the line 3—3 on Fig. 2. Fig. 4 is a detail section taken as indicated at line, 4—4, on Fig. 2.

This invention relates to the type of gage which comprises a vertically extending transparent container for liquid arranged to communicate at its lower end with a tank, reservoir or other receptacle, in which a quantity of liquid is to be maintained whose level is indicated by the level of the liquid in the transparent gage device. Fig. 1 shows this type of gage applied to the crank case and fly wheel housing of an automobile motor in which it is desired to keep oil up to a certain level for the purpose of splash lubrication of the parts.

The gage consists of a glass tube, A, carried in a housing, B, into the lower end of which is connected the pipe, C, leading from the fly-wheel casing indicated at D, in Fig. 1. Directly below the gage tube, A, the housing, B, is provided with a turn-cock, E, and the casing, D, is fitted with a drain plug at F.

The glass tube, A, is held in the housing, B, between yielding gaskets or washers, $G^1$ and $G^2$, the former being lodged in a pocket, $B^1$, in the lower end of the housing, B, and the latter being interposed between the upper end of the tube, A, and the cap, H, which is secured to the housing member, B, by screws, J and K. The screw, K, reaches into a bridge, $B^2$, connecting the lateral walls of the housing, B, as indicated in Fig. 4, and the screw, J, engages a lug, $B^3$, cast in the rear of the housing, B. A vent aperture, $H^1$, is provided in the cap, H, preferably centered in a boss, $H^2$, which extends through the washer, $G^2$, for positioning the tube, A.

The screws, J and K, in addition to securing the cap, H, also serve for the attachment of a fitting, L, carrying a small electric light bulb, M, whose circuit wires, $M^1$ and $M^2$, may connect with any suitable and convenient source of electricity. At the front the housing, B, is formed with a vertically extending window, $B^4$, which reveals a length of the tube, A, corresponding to permissible variations in the level of the oil in the crank case with which the device is connected. The back wall of the housing, B, indicated at $B^5$, is inclined at such an angle with relation to the position of the source of light, M, that such light will be quite thoroughly distributed by reflection from the inner surface, $B^6$, of the housing, B, over the entire length of the tube, A, revealed at the window, $B^4$, so that the light shining through the unoccupied portion of the tube, A, and to some extent through the oil in the remainder of the tube will indicate clearly the exact position of the oil level.

I claim:—

1. An illuminated gage device comprising a glass tube; a housing formed with a pocket in which the lower end of said tube is lodged; an inlet pipe leading into said pocket; a gasket on which the end of the tube is seated in the pocket; the housing extending divergently from the tube at said pocket; a cap resting at one end on the edge of the housing at a distance from the other end of the tube, the other end of said cap bearing upon the other end of said tube, and a clamp screw extending through the cap intermediate said supported parts, and engaging the housing for securing said cap and to hold the tube in position.

2. An illuminated gage device comprising a glass tube; a housing formed with a pocket in which the lower end of said tube is lodged; an inlet pipe leading into said pocket; a gasket on which the end of the tube is seated in the pocket; the housing extending divergently from the tube at said pocket; a cap resting at one end on the edge of the housing at a distance from the other end of the tube, the other end of said cap bearing upon the other end of said tube, and a clamp screw extending through the cap intermediate said supported parts, and engaging the housing for securing said cap and to hold the tube in position, together with an electric lamp suspended in the housing from said cap.

In testimony whereof, I have hereunto set my hand at Chicago, Illinois, this 3rd day of January, 1916.

MARTIN L. CRANMER.

Witnesses:
 LUCY I. STONE,
 EDNA M. MACINTOSH.